UNITED STATES PATENT OFFICE.

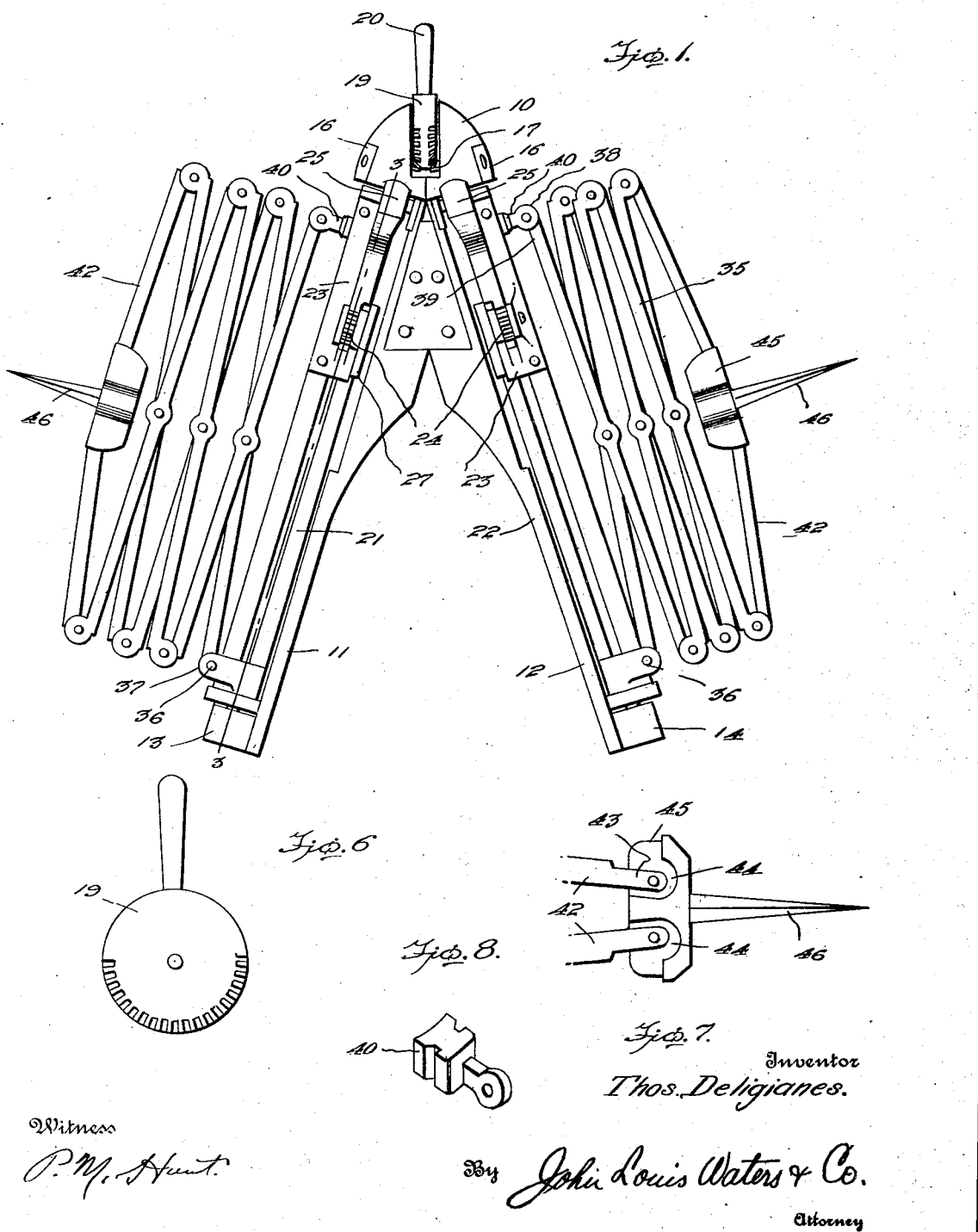

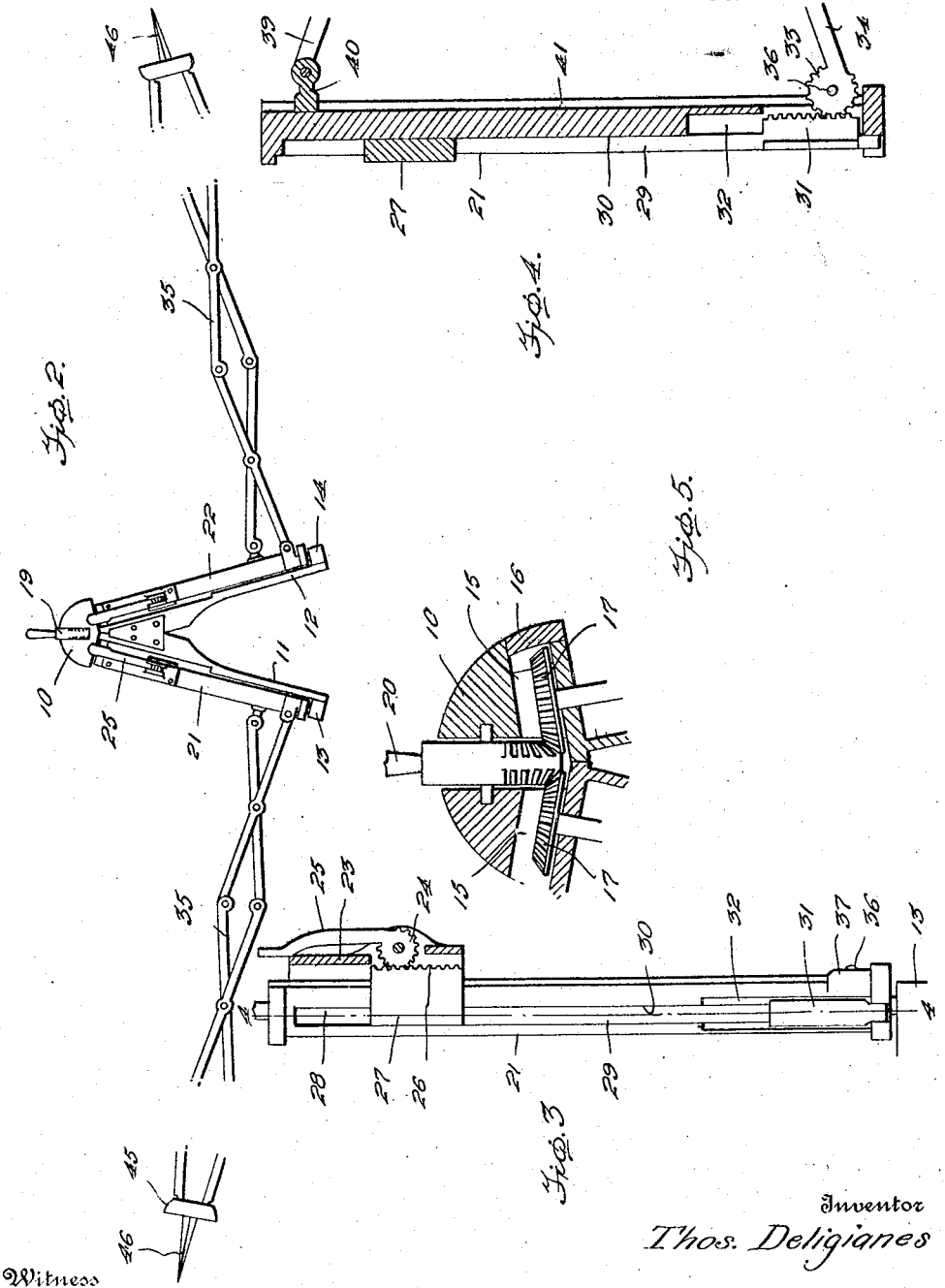

THOMAS DELIGIANES, OF ROCK ISLAND, ILLINOIS.

WEAPON.

1,222,540.  Specification of Letters Patent.  Patented Apr. 10, 1917.

Application filed July 11, 1916. Serial No. 108,762.

*To all whom it may concern:*

Be it known that I, THOMAS DELIGIANES, a citizen of the United States, residing at Rock Island, in the county of Rock Island and State of Illinois, have invented certain useful Improvements in Weapons, of which the following is a specification, reference being had therein to the accompanying drawing.

This invention relates to improvements in weapons, one object of the invention being the provision of a device adapted to be carried while on horse back and to be manipulated to extend or retract at will in opposite directions spears or other pointed weapons, so that the rider will be protected from attack and may readily defend himself by the use of the present device.

A further object of this invention is the provision of a device of this character which comprises two lazy tong members adapted to be mounted at either side of the supporting mechanism which is suspended from the saddle of the rider and provided with manually controlled operating means in ready access to the rider for projecting and retracting both of the lazy tongs simultaneously.

A still further object of this invention is the provision of a device of this character in which the spear or weapon carrying members which consist each of a lazy tongs, are so mounted as to be swung laterally to be projected or retracted for delivering the spear at various distances away from the body of the horse and at different horizontal planes.

In the accompanying drawings:—

Figure 1 is a top plan view of the complete device retracted.

Fig. 2 is a similar view projected.

Fig. 3 is a section taken on line 3—3 of Fig. 1.

Fig. 4 is a section taken on line 4—4 of Fig. 3.

Figs. 5, 6, 7 and 8 are detail views of various parts of the mechanism.

Referring to the drawings, the numeral 10 designates the head member which has connected thereto the two arms 11 and 12, each one of which carries its respective journal box 13 and 14.

Formed in the member 10 are the two oppositely disposed gear receiving sockets 15 closed by the respective covers 16 so that the gears 17 mounted therein may be made accessible from the outside.

Pivoted in the slot 18 of the member 10 is the double faced segmental pinion 19 provided with a handle 20. This pinion is in mesh at all times with the two gears 17 so that by oscillating the member 19 both gears 17 are similarly oscillated.

Connected to each gear 17 and journaled in the member 10 and also the respective boxes 13 and 14, are the oscillatory shafts 21 and 22. As each of these shafts are made similar and carry the same mechanism, the description of one will suffice for both.

Attached to each member 21 and 22 is a casing 23 which has mounted therein a segmental gear 24 controlled by a lever 25.

Mounted for sliding movement in this casing 22 is a rack bar 26 having a curved plate 27 for movement in the recessed portion 28.

The member 27 carries the rod 29 which is slidably mounted in the groove 30 longitudinally of the respective members 21 and 22, and carrying at its opposite end the rack bar 31 which projects into the elongated opening 32 of the member 21 or 22 and engages the segmental gear 33 of one of the inner members 34 of the lazy tong 35 which is secured by means of the pin 36 to the two apertured lugs 37 of the member 21 or 22.

The apertured end 38 of the member 39 is pivotally connected to the sliding member 40 which is mounted in the dovetailed groove 41 of the member 21 or 22, so as to slide therein when the portion 33 is acted upon by the rack bar 31 to either retract or extend the lazy tong.

Mounted in the extreme outer members of the lazy tong are the short strips 42, each one of which has its end 43 pivoted in the respective socket 44 of the holder 45 for the spear or sword 46.

By this means, the spear or sword may be retracted or projected at any desired inclination, the member 19 controlling the horizontal position of the lazy tongs, while the lever 25 controls the projection and retraction thereof.

A rider equipped with this device is enabled in addition to operating the present device, also to manipulate a fire arm by one hand during an attack.

In practice, should a regiment of cavalry be equipped with the present device, a greater number of men and horses could be withstood, the same being so constructed as to provide an offensive device at each side of the horse, while in attacking infantry, the infantry would be rendered powerless.

What I claim as new is:—

1. A device of this character, including a supporting member, a shaft mounted for oscillation therein, means for oscillating the shaft, a lazy tong connected to said shaft and pivotally carried thereby, one member of the inner end thereof being slidably connected to the shaft and the other member being pivoted at a fixed point, and coöperative means carried by the shaft and the latter member of the lazy tong whereby the lazy tong is projected or retracted.

2. A device of this character, including a supporting member, a shaft mounted for oscillation therein, means for oscillating the shaft, a lazy tong connected to said shaft and pivotally carried thereby, one member of the inner end thereof being slidably connected to the shaft and the other member being pivoted at a fixed point, coöperative means carried by the shaft and the latter member of the lazy tong whereby the lazy tong is projected or retracted, and a blade carried by the outer free end of the lazy tong.

3. A device of this character, including a supporting member, a shaft mounted for oscillation therein, means for oscillating the shaft, a lazy tong connected to said shaft and pivotally carried thereby, one member of the inner end thereof being slidably connected to the shaft and the other member being pivoted at a fixed point, a rack bar slidably mounted in the shaft and operably connected to the fixed pivot of the lazy tong, and manually controlled means for actuating the rack bar to project and retract the lazy tong.

4. A device of this character, including a supporting member, a shaft mounted for oscillation therein, means for oscillating the shaft, a lazy tong connected to said shaft and pivotally carried thereby, one member of the inner end thereof being slidably connected to the shaft and the other member being pivoted at a fixed point, a rack bar slidably mounted in the shaft and operably connected to the fixed pivot of the lazy tong, manually controlled means for actuating the rack bar to project and retract the lazy tong, and a blade carried by the outer free end of the lazy tong.

5. A device of this character including two divergent supporting members, a connecting member therefor at one end, two shafts, one journaled in each of said supporting members, a coöperative gearing mounted in the connecting member and operably connected to the shafts, whereby both of said shafts are oscillated in unison, a weapon carrying lazy tong connected to each shaft, and coöperable means connected to each shaft and each lazy tong for retracting or projecting each lazy tong.

In testimony whereof I affix my signature.

THOMAS DELIGIANES.

Copies of this patent may be obtained for five cents each, by addressing the "Commissioner of Patents, Washington, D. C."